United States Patent
Bhat et al.

(10) Patent No.: US 9,942,351 B2
(45) Date of Patent: Apr. 10, 2018

(54) ENABLING AND DISABLING EXECUTION ENVIRONMENTS

(71) Applicant: International Business Machines Corporation, Armonk, NY (US)

(72) Inventors: B.G. Prashanth Bhat, Bangalore (IN); Amith Nagabhushan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 14/571,421

(22) Filed: Dec. 16, 2014

(65) Prior Publication Data

US 2016/0173640 A1    Jun. 16, 2016

(51) Int. Cl.
*G06F 15/173* (2006.01)
*H04L 29/08* (2006.01)

(52) U.S. Cl.
CPC .......... *H04L 67/32* (2013.01); *H04L 67/1002* (2013.01)

(58) Field of Classification Search
CPC ............................ H04L 67/32; H04L 67/1002
USPC ......................................................... 709/225
See application file for complete search history.

(56) References Cited

U.S. PATENT DOCUMENTS

| | | | | |
|---|---|---|---|---|
| 7,689,862 | B1 * | 3/2010 | Bharthulwar | G06F 11/2046 714/13 |
| 8,448,161 | B2 | 5/2013 | Goldman | |
| 8,490,120 | B2 | 7/2013 | Cable | |
| 2005/0015761 | A1 * | 1/2005 | Chang | G06F 9/44505 717/174 |
| 2005/0120160 | A1 * | 6/2005 | Plouffe | G06F 9/45537 711/1 |
| 2009/0037835 | A1 * | 2/2009 | Goldman | G06F 8/65 715/771 |
| 2009/0172149 | A1 * | 7/2009 | Bobak | G06Q 10/06 709/224 |
| 2009/0172688 | A1 * | 7/2009 | Bobak | G06Q 10/06 718/104 |

(Continued)

OTHER PUBLICATIONS

Bellur, Umesh, "A Methodology & Tool for Determining Intercomponent Dependencies Dynamically in J2EE Environments", Third International Conference on Autonomic and Autonomous Systems (ICAS'07), © 2007 IEEE.

(Continued)

*Primary Examiner* — Philip Chea
*Assistant Examiner* — Wing Ma
(74) *Attorney, Agent, or Firm* — Christopher McLane; Alexa Ashworth

(57) ABSTRACT

The method includes receiving a request to access an application. The method further includes identifying features of the application comprising one or both of an application dependency framework, and an application context root. The method further includes determining if a first cluster member is available to process the request for access to the application based at least in part on one or more of the identified feature of the application, a load on the first cluster member, and a resource utilization on the first cluster member. The method further includes, in response to determining that the first cluster member is not available, sending a request to enable an execution environment associated with the first cluster member, based upon the identified feature of the application.

17 Claims, 3 Drawing Sheets

(56) References Cited

U.S. PATENT DOCUMENTS

| | | | | |
|---|---|---|---|---|
| 2009/0172689 | A1* | 7/2009 | Bobak | G06F 9/5061 718/104 |
| 2009/0172769 | A1* | 7/2009 | Bobak | H04L 41/5012 726/1 |
| 2010/0031247 | A1* | 2/2010 | Arnold | G06F 8/61 717/174 |
| 2010/0088150 | A1* | 4/2010 | Mazhar | G06F 9/5088 717/120 |
| 2010/0192157 | A1* | 7/2010 | Jackson | G06F 9/5027 718/104 |
| 2011/0126207 | A1* | 5/2011 | Wipfel | H04L 9/3213 718/104 |
| 2011/0213753 | A1* | 9/2011 | Manmohan | G06F 11/2023 707/640 |
| 2012/0059938 | A1* | 3/2012 | Albing | G06F 9/5066 709/226 |
| 2012/0174112 | A1* | 7/2012 | Vaidya | G06F 9/4856 718/104 |
| 2012/0203823 | A1* | 8/2012 | Manglik | G06F 9/5072 709/203 |
| 2012/0233591 | A1 | 9/2012 | Thyagarajan et al. | |
| 2013/0124807 | A1* | 5/2013 | Nielsen | G06F 11/1438 711/162 |
| 2013/0151711 | A1* | 6/2013 | Jackson | G06F 9/5027 709/226 |
| 2013/0227558 | A1* | 8/2013 | Du | G06F 9/45558 718/1 |
| 2013/0232497 | A1 | 9/2013 | Jalagam et al. | |
| 2013/0263139 | A1 | 10/2013 | Schejter et al. | |
| 2014/0033205 | A1 | 1/2014 | Kashyap et al. | |
| 2014/0280961 | A1* | 9/2014 | Martinez | H04L 41/5054 709/226 |
| 2014/0282495 | A1* | 9/2014 | Chico de Guzman Huerta | G06F 8/61 717/177 |
| 2015/0058459 | A1* | 2/2015 | Amendjian | H04L 41/5058 709/223 |
| 2015/0089031 | A1* | 3/2015 | Kalali | H04L 67/34 709/220 |
| 2015/0120938 | A1* | 4/2015 | Mordani | H04L 41/5054 709/226 |
| 2015/0121483 | A1* | 4/2015 | Perez | H04L 41/5041 726/5 |
| 2015/0142878 | A1* | 5/2015 | Hebert | H04L 67/10 709/203 |
| 2015/0205625 | A1* | 7/2015 | He | G06F 9/455 718/1 |
| 2015/0378702 | A1* | 12/2015 | Govindaraju | G06F 8/61 717/177 |
| 2015/0378765 | A1* | 12/2015 | Singh | G06F 9/45558 718/1 |
| 2015/0381711 | A1* | 12/2015 | Singh | H04L 41/0813 709/221 |
| 2016/0034809 | A1* | 2/2016 | Trenholm | H04L 41/5041 706/20 |
| 2016/0080320 | A1* | 3/2016 | Barakat | H04L 63/00 726/4 |
| 2016/0094483 | A1* | 3/2016 | Johnston | H04L 47/827 709/226 |
| 2016/0239595 | A1* | 8/2016 | Maes | G06F 9/5061 |
| 2016/0254961 | A1* | 9/2016 | Maes | G06F 17/30557 709/226 |

OTHER PUBLICATIONS

Dutta et al., "ReDAL: An Efficient and Practical Request Distribution Technique for Application Server Clusters", IEEE Transactions on Parallel and Distributed Systems, vol. 18, No. 11, Nov. 2007, pp. 1516-1528, @ 2007 IEEE.

* cited by examiner

US 9,942,351 B2

ENABLING AND DISABLING EXECUTION ENVIRONMENTS

BACKGROUND OF THE INVENTION

The present invention relates generally to a server setup running in a cluster environment, and more particularly to an application server containing more than one kind of execution environment.

Large scale server installations, which have to handle thousands of requests, are usually designed as high performance clustered environments. A clustered environment enables the application server setup to scale according to the workload. Administrators can decide on the number of cluster members based on estimated load from the applications. In some cases, a production level application server setup on cloud would be designed to elastically scale based on load and where a new virtual instance can be provisioned when required and then taken back when the load reduces.

SUMMARY

Embodiments of the present invention disclose a method, computer program product and system for enabling and disabling execution environments. In one embodiment, in accordance with the present invention, the computer-implemented method includes receiving a request to access an application. The method further includes identifying features of the application comprising one or both of an application dependency framework, and an application context root. The method further includes determining if a first cluster member is available to process the request for access to the application based at least in part on one or more of the identified feature of the application, a load on the first cluster member, and a resource utilization on the first cluster member. The method further includes, in response to determining that the first cluster member is not available, sending a request to enable an execution environment associated with the first cluster member, based upon the identified feature of the application.

DETAILED DESCRIPTION

Embodiments of the present invention recognize that it may be desirable to enable and disable individual execution environments in a hybrid application server. Towards that end, embodiments of the present invention provide for optimized utilization of cluster members as well as their execution environments, thereby achieving better utilization of hardware resources.

Implementation of embodiments of the invention may take a variety of forms, and exemplary implementation details are discussed subsequently with reference to the Figures.

Figure 1:
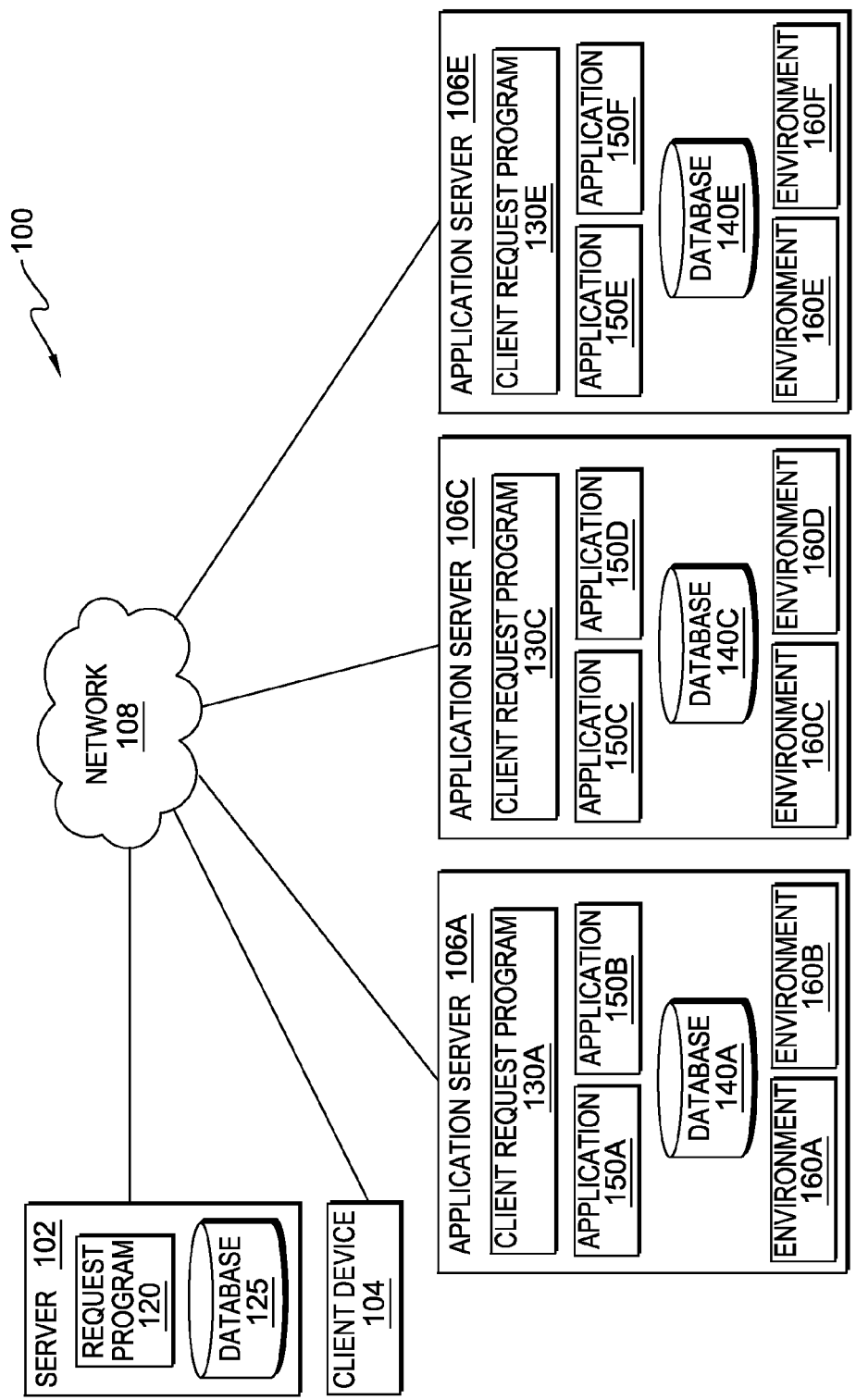
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server 102, client device 104, and application servers 106A, C, and E all interconnected over network 108. Network 108 represents, for example, a telecommunications network, a local area network (LAN), a wide area network (WAN), such as the Internet, or a combination of the three, and includes wired, wireless, and/or fiber optic connections. Network 108 includes one or more wired and/or wireless networks that are capable of receiving and transmitting data, voice, and/or video signals, including multimedia signals that include voice, data, and video information.

In the depicted environment, server 102 is one or more of a management server, a web server, or any other electronic device or computing system capable of receiving and sending data. In other embodiments, server 102 represents a server computing system utilizing multiple computers as a server system, such as in a cloud computing environment. In another embodiment, server 102 represents a laptop computer, a tablet computer, a netbook computer, a personal computer (PC), a desktop computer, a personal digital assistant (PDA), a smart phone, or any programmable electronic device capable of communicating with client device 104 and application servers 106A, C, and E via network 108. Server 102 may include components as depicted and described in further detail with respect to FIG. 3, in accordance with embodiments of the present invention. In another embodiment, server 102 represents a computing system utilizing clustered computers and components to act as a single pool of seamless resources. In an embodiment, server 102 acts as a request router which routes incoming requests from client devices (e.g., client device 104) to one of the application servers (e.g., application servers 106A, C, and E). Server 102 includes request program 120 and database 125.

In depicted distributed data processing environment 100, request program 120 resides on server 102 and enables and disables individual execution environments in a hybrid application server. In one embodiment, request program 120 receives a request from a user to access an application, and request program 120 uses application dependency framework and individual application context roots to determine the list of execution environments which are needed for a given application. Request program 120 identifies probable cluster members based on the determined list of execution environments as well as other existing routing methodologies known in the art (e.g., routing based on the load of each individual member, resource utilization, etc.). In an embodiment, request program 120 enables the execution environments that are required for the application if the execution environments are not running in the identified cluster member and routes the request to the identified cluster once the environment is enabled. The functions and operations of request program 120 are depicted and described in further detail with respect to FIG. 2.

In the depicted embodiment, database 125 resides on server 102. In another embodiment, database 125 may reside elsewhere in distributed data processing environment 100, independently as a standalone database that is capable of communicating with server 102, application servers 106A, C, and E, and client device 104 via network 108. A database is an organized collection of data. Database 125 is implemented with any type of storage device capable of storing data that is accessed and utilized by server 102, such as a database server, a hard disk drive, or a flash memory. In other embodiments, database 125 represents multiple storage devices within server 102. Database 125 stores information, such as dependency information between various modules in applications on application servers, such as application server 106A. Database 125 may receive the dependency information through the deployment descriptor in the application deployment package by requesting and receiving information from application servers (e.g., application server 106A) or any other method known in the art.

In the depicted embodiment, client device 104 is one or more of a desktop computer, a laptop computer, a tablet computer, a specialized computer server, a smart phone, or any programmable electronic device capable of communicating with server 102, and application servers 106A, C, and E via network 108 and with various components and devices within distributed data processing environment 100. In general, client device 104 represents any programmable electronic device or combination of programmable electronic devices capable of executing machine readable program instructions and communicating with other computing devices via a network, such as network 108. In an embodiment, client device 104 sends a request to server 102 via network 108, to access an application on an application server. Client device 104 may include components as depicted and described in further detail with respect to FIG. 3, in accordance with embodiments of the present invention.

In the depicted environment, application servers 106A, C, and E are one or more of a management server, a web server, or any other electronic device or computing system capable of receiving and sending data. In other embodiments, application servers 106A, C, and E represent a server computing system utilizing multiple computers as a server system, such as in a cloud computing environment. In another embodiment, application servers 106A, C, and E represent a laptop computer, a tablet computer, a netbook computer, a personal computer (PC), a desktop computer, a personal digital assistant (PDA), a smart phone, or any programmable electronic device capable of communicating with client device 104 and server 102 via network 108. Application servers 106A, C, and E may include components as depicted and described in further detail with respect to FIG. 3, in accordance with embodiments of the present invention. In another embodiment, application servers 106A, C, and E represent a computing system utilizing clustered computers and components to act as a single pool of seamless resources. In various embodiments, the amount of application servers may be more or less than three.

In an embodiment, application servers 106A, C, and E allow for the deployment and execution of applications written using technologies supported by execution environments located on application servers 106A, C, and E. Application servers 106A, C, and E include client request programs 130A, C, and E respectively. Application servers 106A, C, and E also include applications 150A and B on application server 106A, applications 150C and D on application server 106C, and applications 150E and F on application server 106E. Application servers 106A, C, and E further include databases 140A, C, and E respectively. Application servers 106A, C, and E also include environments 160A and B on application server 106A, environments 160C and D on application server 106C, and environments 160E and F on application server 106E.

Client request programs 130A, C, and E receive and send requests and instructions from request program 120 regarding enabling and disabling of environments located on the respective application server (e.g., application server 106A). In one embodiment, client request programs 130A, C, and E enable and/or disable environments (e.g., environment 160A) located on application server 106A, C, and E. In another embodiment, a client request program (e.g., client request program 130A) may send data indicating that all environments located on the application server (e.g., application server 106A) are currently occupied.

In an embodiment, applications 150A, B, C, D, E, and F are the application codes written using one or more technologies or languages. For example, an application (e.g., application 150A) that is deployed through a single application deployment bundle may comprise multiple modules written using one or more technologies or languages. An application (e.g., application 150A) may also comprise a deployment descriptor which has the dependency information between the modules as well as on the execution environments. In an example, an application (e.g., application 150A) may be deployed separately, in which case a mechanism to define the dependencies between the applications would exist (e.g., a user of client device 104 may be able to define the dependencies information explicitly either through a file or a graphical user interface or any other method known in the art).

In the depicted embodiment, databases 140A, C, and E reside on application servers 106A, C, and E. In embodiment, databases 140A, C, and E may reside elsewhere in distributed data processing environment 100, independently as a standalone database that is capable of communicating with server 102, application servers 106A, C, and E, and client device 104 via network 108. A database is an organized collection of data. Databases 140A, C, and E are implemented with any type of storage device capable of storing data that is accessed and utilized by application servers 106A, C, and E, such as a database server, a hard disk drive, or a flash memory. In other embodiments, databases 140A, C, and E represent multiple storage devices within application servers 106A, C, and E. Databases 140A, C, and E store information, such as dependency information between various modules in applications received. Databases 140A, C, and E may receive the dependency information through the deployment descriptor in the application deployment package or any other method known in the art.

In an embodiment, an environment (e.g., environment 160A) operates as a deployment and runtime environment which supports deployment and execution of a specific type of application (e.g., application 150A but not application 150B) or an application written using specific technology. In an example, the environment (e.g., environment 160A) operates as a runtime environment which can support rapid, high-volume online transaction processing, as known in the art.

Figure 2:
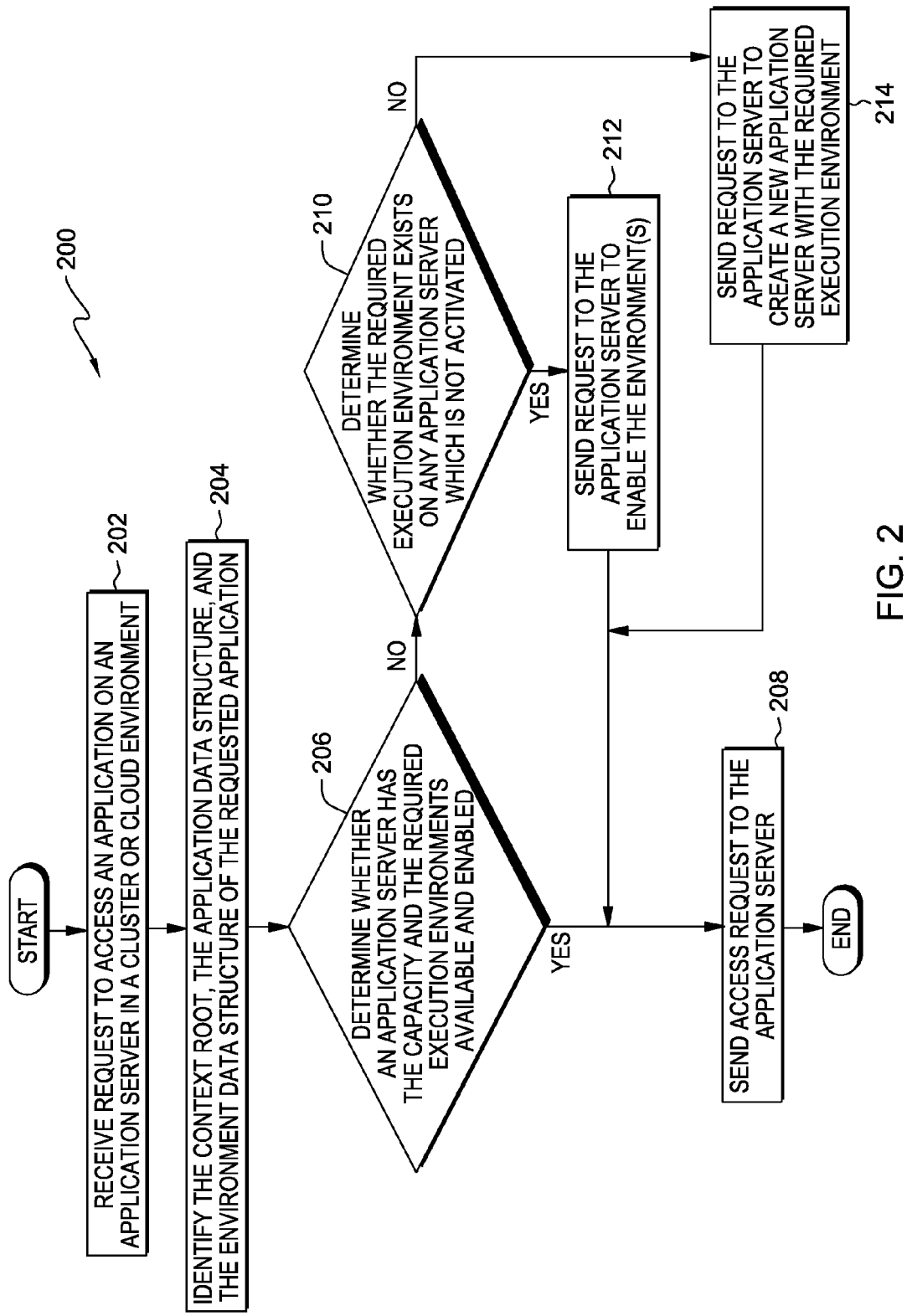
FIG. 2 is a flowchart depicting operational steps of a program for enabling and disabling individual execution environments in a hybrid application server within the distributed data processing environment of FIG. 1, in accordance with an embodiment of the present invention.

FIG. 2 is a flowchart depicting operational steps of program 200, which is a function of request program 120, in accordance with an embodiment of the present invention. Request program 120 operates on server 102 and is used for enabling and disabling individual execution environments in a hybrid application server. In one embodiment, request program 120 is continually monitoring requests and program 200 is one example flowchart beginning with a single request from a user to utilize an application on an application server. In another embodiment, request program 120 begins the operational steps of program 200 in response to receiving a request from a user to access an application server which is utilized by request program 120.

Program 200 receives a request to access an application on an application server in a cluster or cloud environment (step 202). In one embodiment, request program 120 receives a request from a client device (e.g., client device 104) that indicates the client device would like to access an application server (e.g., application server 106A). In an example, request program 120 may receive a request from client device 104 indicating that client device 104 would like to utilize a specific application located on application server 106A. In another example, program 200 is hosted on a uniform resource locator (URL), and program 200 receives the request when a client device (e.g., client device 104) tries to access the URL.

In various embodiments, if an execution environment (e.g., environments 160A-F) does not get a request for a specified amount of time, the execution environment informs a client request program (e.g., client request program 130A, C, or E) which disables the execution environment. In these embodiments, request program 120 receives data indicating the client request program has disabled the execution environment (e.g., environments 160A-F) for an application server (e.g., application server 106A, C, or E). Request program 120 then stores the information regarding the disabled execution environments in a database, such as database 125.

Program 200 identifies the context root, the application data structure, and the environment data structure of the requested application (step 204). In various embodiments, program 200 identifies the context root, the application data structure, and the environment data structure. In an example, a request is received from client device 104 for a stock trading application (e.g., application 150A) that is written in a specific language and has a dependency on a broker application (e.g., application 150B). The broker application (e.g., application 150B) is written in a different language than the stock trading application (e.g., application 150A). Information indicating that the stock trading application (e.g., application 150A) depends on broker application (e.g., application 150B) is stored in a data structure, which is stored in a database, such as database 140A and/or database 125. The stock trading application (e.g., application 150A) and the broker application (e.g., application 150B) are deployed on the same application server (e.g., application server 106A) but separate execution environments (e.g., environments 160A and B). In an example, program 200 receives a request from a client device to URL: http://www.webapplication.com/daytrader/login.jsp. In this example, program 200 identifies the context root "daytrader" which uniquely identifies the application which is to be invoked.

In various embodiments, the dependency and environment information is available in the data structure. In an example, dependency information is the information that indicates the stock trading application (e.g., application 150A) is dependent upon the broker application (e.g., application 150B). The dependency information can be stored in a database, such as database 140A and/or database 125. In another example, environment information is the information that indicates that a web application (e.g., a stock trading application, application 150A, etc.) needs a certain computer language execution environment and another web application (e.g., a broker application, application 150B, etc.) needs a different computer language execution environment.

Program 200 determines whether an application server has the capacity and the required execution environments available and enabled (decision 206). In various embodiments, program 200 determines whether an application server (e.g., application server 106A) has the required execution environments available and enabled. In one example, program 200 may access information regarding the application servers stored in database 125. In another example, program 200 queries application server 106A to determine if application server 106A has enough capacity to complete the application request from client device 104. Program 200 also queries application server 106A to determine if the required execution environments are available and enabled. In various embodiments, program 200 may submit the queries for capacity, availability, and enablement at the same time or in any order at separate times.

In response to program 200 determining that an application server has the required capacity and the required execution environments available and enabled (yes branch, decision 206), program 200 sends an access request to the application server (step 208). In an embodiment, program 200 receives a response from an application server (e.g., application server 106A) that indicates that the application server has the required capacity and execution environments which are enabled. In another embodiment, program 200 may determine that the application server (e.g., application server 106A) has the required capacity and the required execution environments which are enabled from data stored in database 125. Program 200 sends the access request from the client device (e.g., client device 104) that originated the request to the identified application server (e.g., application server 106A). In an example, program 200 receives a response from application server 106A indicating that application server 106A has 20 gigabytes of capacity available when only 1 gigabyte is required, and the required execution environments (e.g., environment 160A and B) are enabled and available in the required computer language. As the capacity requirements are met and the required execution environments are enabled, program 200 sends the access request from client device 104 to application server 106A.

In response to program 200 determining that an application server does not have the capacity or the required execution environments available and enabled (no branch, decision 206), program 200 determines whether the required execution environment exists on any application server which is not activated (decision 210). In some embodiments, program 200 may receive information from an application server (e.g., application server 106A), or program 200 may access database 125 for information indicating that an application server (e.g., application server 106A) has the available capacity and has the required execution environment(s) (e.g., environments 160A and B) but neither of the environments are enabled. In an example, program 200 queries multiple application servers (e.g., application servers 106A, C, and E) and receives information indicating that application server 106A does not have the capacity to handle the request, but application servers 106C and E do have the capacity. The received information also indicates that application servers 106C and E have the required execution environments. In other embodiments, program 200 may determine that the capacity of the execution environments are not available and therefore, does not query application servers for information pertaining to execution environments and queries only application servers which have sufficient capacity.

In response to program 200 determining that the required execution environment exists in any application server which is not activated (yes branch, decision 210), program 200 sends a request to the application server to enable the environment(s) (step 212). In various embodiments, program 200 sends a request to an application server (e.g., application server 106C) indicating that an execution environment (e.g., environment 160C) needs to be enabled. In an example, program 200 has determined that there are no application servers currently which can handle the initial request from client device 104. Program 200 determined that application server 106C can handle the request; however, the execution environment required is not enabled. Program 200 sends a request to application server 106C which indicates that environment 160C is to be enabled. In another embodiment, program 200 may send a request to an application server (e.g., application server 106C) indicating that multiple execution environments need to be enabled (e.g., environments 160C and D).

In response to program 200 determining that the required execution environment is not free to handle requests in any application server which is active (no branch, decision 210), program 200 creates a new application server (step 214). In an embodiment, there may only be two application servers (e.g., application server 106A and C) which have the needed application (e.g., any variation of application 150A-F), but the two application servers (e.g., application server 106A and C) do not have the capacity to handle the request. In this embodiment, program 200 creates a new application server (e.g., application server 106E) which contains the required application (e.g., application 150E) and execution environments (e.g., environments 160E and F) that are enabled and compatible with the required application. In an example, program 200 creates application server 106E to host a stock trading application (e.g., application 150E), a broker application (e.g., application 150F), and the corresponding environments (environments 160E and F) for the specific languages required by each application.

Figure 3:
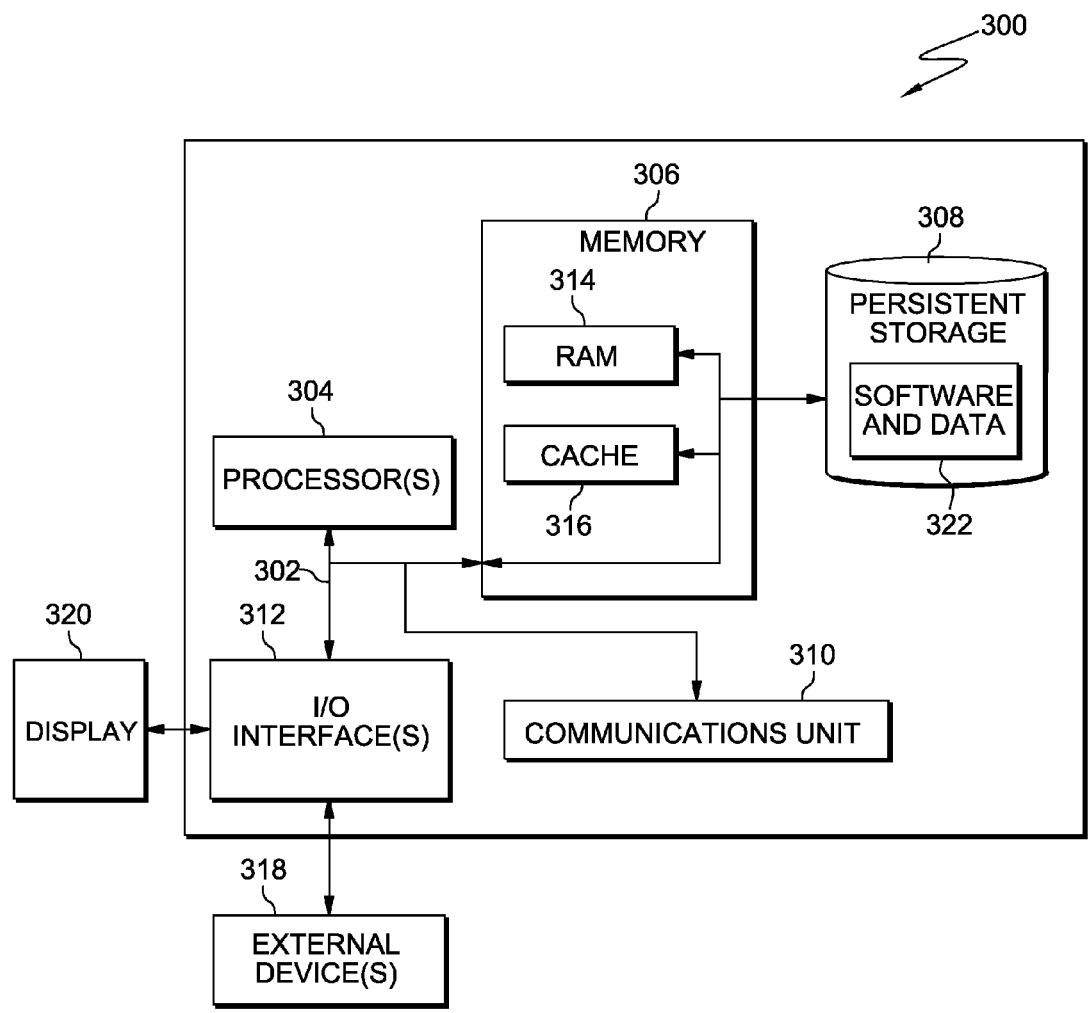
FIG. 3 depicts a block diagram of internal and external components of the servers and client device of FIG. 1, in accordance with an embodiment of the present invention.

FIG. 3 depicts a block diagram of components of computer 300, which is representative of server 102, client device 104, and application servers 106A, C, and E, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computer 300 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications, and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 314 and cache memory 316. In general, memory 306 can include any suitable volatile or non-volatile computer readable storage media. Software and data 322 are stored in persistent storage 308 for access and/or execution by processor(s) 304 via one or more memories of memory 306. With respect to server 102, software and data 322 represents request program 120 and database 125.

In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Software and data 322 may be downloaded to persistent storage 308 through communications unit 310.

I/O interface(s) 312 allows for input and output of data with other devices that may be connected to computer 300. For example, I/O interface(s) 312 may provide a connection to external device(s) 318 such as a keyboard, a keypad, a touch screen, and/or some other suitable input device. External device(s) 318 can also include portable computer readable storage media such as, for example, thumb drives, portable optical or magnetic disks, and memory cards. Software and data 322 can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for enabling and disabling execution environments, the method comprising:
   receiving, by one or more computer processors, a request to access an application;
   identifying, by one or more computer processors, features of the application comprising an application dependency framework and an application context root;
   identifying, by one or more computer processors, one or more cluster members within a database, wherein the database includes: a capacity, execution environments, and an enablement for each of the one or more cluster members;

determining, by one or more computer processors, a first cluster member of the identified one or more cluster members to process the request for access to the application based on: the identified features of the application, a load on the first cluster member, a resource utilization on the first cluster member, and the enablement is enabled;

determining, by one or more computer processors, an availability of the first cluster member, wherein availability of the first cluster member is based on determining: an available capacity that accommodates a required capacity associated with an execution environment without exceeding the available capacity associated with the first cluster member, an execution environment that allows deployment and execution of the application based on an application dependency framework and the application context root, and an enabled execution environment associated with the first cluster member, wherein the enabled execution environment is running;

determining, by one or more computer processors, that no cluster member is available to process the request for access to the application based on the determined availability;

identifying, by one or more computer processors, a second cluster member which has a disabled execution environment;

determining, by one or more computer processors, whether the available capacity and the execution environment associated with the identified second cluster member can process the request for access to the application by enabling the disabled execution environment based on the identified features of the application, a load on the second cluster member, and a resource utilization on the second cluster member; and in response to determining that the identified second cluster member can process the request for access to the application by enabling the disabled execution environment, sending, by one or more computer processors, a request to enable an execution environment associated with the second cluster member, based upon the identified features of the application.

2. The method of claim 1, further comprising:
determining, by one or more computer processors, whether an enabled execution environment is being utilized; and
responsive to determining that the enabled execution environment is not being utilized, sending, by one or more computer processors, a request to disable the enabled execution environment.

3. The method of claim 1, further comprising:
responsive to determining the identified second cluster member cannot process the request for access to the application by enabling the disabled execution environment, creating, by one or more processors, a new cluster member, wherein the new cluster member comprises the application and one or more enabled execution environments associated with the application.

4. The method of claim 1, wherein sending a request to enable an execution environment associated with the second cluster member, based upon the identified features of the application comprises:
identifying, by one or more computer processors, a computer language needed for the application; and
sending, by one or more computer processors, a request to enable the execution environment associated with the second cluster member, based at least in part upon the identified computer language.

5. The method of claim 1, wherein identifying an application dependency framework comprises identifying, by one or more computer processors, information that includes dependency information that indicates whether the application requires another application on the same cluster member, and environment information that indicates whether the application requires a different computer language execution environment.

6. The method of claim 1, wherein identifying an application context root comprises identifying, by one or more computer processors, data indicating a unique application which is to be invoked on the first cluster member.

7. A computer program product for enabling and disabling execution environments, the computer program product comprising:
one or more computer readable storage devices and program instructions stored on the one or more computer readable storage devices, the program instructions comprising:
program instructions to receive a request to access an application;
program instructions to identify features of the application comprising an application dependency framework and an application context root;
program instructions to identify one or more cluster members within a database, wherein the database includes: a capacity, execution environments, and an enablement for each of the one or more cluster members;
program instructions to determine a first cluster member of the identified one or more cluster members to process the request for access to the application based on: the identified features of the application, a load on the first cluster member, a resource utilization on the first cluster member, and the enablement is enabled;
program instructions to determine an availability of the first cluster member, wherein availability of the first cluster member is based on determining: an available capacity that accommodates a required capacity associated with an execution environment without exceeding the available capacity associated with the first cluster member, an execution environment that allows deployment and execution of the application based on an application dependency framework and the application context root, and an enabled execution environment associated with the first cluster member, wherein the enabled execution environment is running;
program instructions to determine that no cluster member is available to process the request for access to the application based on the determined availability;
program instructions to identify a second cluster member which has a disabled execution environment;
program instructions to determine whether the available capacity and the execution environment associated with the identified second cluster member can process the request for access to the application by enabling the disabled execution environment based on the identified features of the application, a load on the second cluster member, and a resource utilization on the second cluster member; and
in response to determining that the identified second cluster member can process the request for access to the application by enabling the disabled execution environment, program instructions to send a request to enable an execution environment associated with the second cluster member, based upon the identified features of the application.

8. The computer program product of claim 7, further comprising program instructions to:
determine whether an enabled execution environment is being utilized; and
responsive to determining that the enabled execution environment is not being utilized, program instructions to send a request to disable the enabled execution environment.

9. The computer program product of claim 7, further comprising program instructions to:
responsive to program instructions to determine the identified second cluster member cannot process the request for access to the application by enabling the disabled execution environment, program instructions to create a new cluster member, wherein the new cluster member comprises the application and one or more enabled execution environments associated with the application.

10. The computer program product of claim 7, wherein sending a request to enable an execution environment associated with the second cluster member, based upon the identified features of the application comprises program instructions to:
identify a computer language needed for the application; and
send a request to enable the execution environment associated with the second cluster member, based at least in part upon the identified computer language.

11. The computer program product of claim 7, wherein the program instructions to identify an application dependency framework comprise program instructions to identify information that includes dependency information that indicates whether the application requires another application on the same cluster member, and environment information that indicates whether the application requires a different computer language execution environment.

12. The computer program product of claim 7, wherein program instructions to identify an application context root comprises program instructions to identify data indicating a unique application which is to be invoked on the first cluster member.

13. A computer system for enabling and disabling execution environments, the computer program system comprising:
one or more computer processors;
one or more computer readable storage media;
program instructions stored on the computer readable storage media for execution by at least one of the one or more computer processors, the program instructions comprising:
program instructions to receive a request to access an application;
program instructions to identify features of the application comprising an application dependency framework and an application context root;
program instructions to identify one or more cluster members within a database, wherein the database includes: a capacity, execution environments, and an enablement for each of the one or more cluster members;
program instructions to determine a first cluster member of the identified one or more cluster members to process the request for access to the application based on: the identified features of the application, a load on the first cluster member, a resource utilization on the first cluster member, and the enablement is enabled;
program instructions to determine an availability of the first cluster member, wherein availability of the first cluster member is based on determining: an available capacity that accommodates a required capacity associated with an execution environment without exceeding the available capacity associated with the first cluster member, an execution environment that allows deployment and execution of the application based on an application dependency framework and the application context root, and an enabled execution environment associated with the first cluster member, wherein the enabled execution environment is running;
program instructions to determine that no cluster member is available to process the request for access to the application based on the determined availability;
program instructions to identify a second cluster member which has a disabled execution environment;
program instructions to determine whether the available capacity and the execution environment associated with the identified second cluster member can process the request for access to the application by enabling the disabled execution environment based on the identified features of the application, a load on the second cluster member, and a resource utilization on the second cluster member; and
in response to determining that the identified second cluster member can process the request for access to the application by enabling the disabled execution environment, program instructions to send a request to enable an execution environment associated with the second cluster member, based upon the identified features of the application.

14. The computer system of claim 13, further comprising program instructions to:
determine whether an enabled execution environment is being utilized; and
responsive to determining that the enabled execution environment is not being utilized, program instructions to send a request to disable the enabled execution environment.

15. The computer system of claim 13, further comprising program instructions to:
responsive to program instructions to determine the identified second cluster member cannot process the request for access to the application by enabling the disabled execution environment, program instructions to create a new cluster member, wherein the new cluster member comprises the application and one or more enabled execution environments associated with the application.

16. The computer system of claim 13, wherein sending a request to enable an execution environment associated with the second cluster member, based upon the identified features of the application comprises program instructions to:
identify a computer language needed for the application; and
send a request to enable the execution environment associated with the second cluster member, based at least in part upon the identified computer language.

17. The computer system of claim 13, wherein the program instructions to identify an application dependency framework comprise program instructions to identify information that includes dependency information that indicates whether the application requires another application on the same cluster member, and environment information that indicates whether the application requires a different computer language execution environment.

\* \* \* \* \*